United States Patent
Choi et al.

(10) Patent No.: US 12,298,802 B2
(45) Date of Patent: May 13, 2025

(54) DISPLAY APPARATUS INCLUDING ROTATOR FOR ROTATING DISPLAY MODULE

(71) Applicant: SAMSUNG ELECTRONICS CO., LTD., Suwon-si (KR)

(72) Inventors: Daesu Choi, Suwon-si (KR); Jisu Kim, Suwon-si (KR); Hunsung Kim, Suwon-si (KR); Sangbong Jeon, Suwon-si (KR); Hyunyong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 17/983,103

(22) Filed: Nov. 8, 2022

(65) Prior Publication Data

US 2023/0205258 A1 Jun. 29, 2023

Related U.S. Application Data

(63) Continuation of application No. PCT/KR2022/014080, filed on Sep. 21, 2022.

(30) Foreign Application Priority Data

Dec. 28, 2021 (KR) .................. 10-2021-0189807

(51) Int. Cl.
*G06F 1/16* (2006.01)
*F16M 11/10* (2006.01)

(52) U.S. Cl.
CPC ......... *G06F 1/1601* (2013.01); *F16M 11/105* (2013.01)

(58) Field of Classification Search
CPC ....... G06F 1/1601; G06F 1/106; F16M 11/00; F16M 11/10; F16M 11/105
See application file for complete search history.

(56) References Cited

U.S. PATENT DOCUMENTS

| | | | |
|---|---|---|---|
| 6,443,408 B1 * | 9/2002 | Hung | F16M 11/2021 248/176.1 |
| 7,643,276 B2 * | 1/2010 | Shin | F16M 11/2064 361/679.06 |

(Continued)

FOREIGN PATENT DOCUMENTS

| | | |
|---|---|---|
| EP | 3 730 830 A1 | 10/2020 |
| JP | 9-265263 A | 10/1997 |

(Continued)

OTHER PUBLICATIONS

International Search Report (PCT/ISA/210) issued from the International Searching Authority on Jan. 18, 2023 to International Application No. PCT/KR2022/014080.

(Continued)

*Primary Examiner* — Monica E Millner
(74) *Attorney, Agent, or Firm* — Sughrue Mion, PLLC

(57) ABSTRACT

A display apparatus includes a display module, and a rotator coupled to the display module and provided to rotate the display module between a first mode in which the display module is vertically disposed and a second mode in which the display module is horizontally disposed, and the rotator includes a driving motor configured to provide a driving force, a first gear configured to rotate around a first rotating axis parallel to a driving axis of the driving motor by the driving force from the driving motor, and a second gear configured to mesh with the first gear and rotate around a second rotating axis parallel to the driving axis and the first rotating axis, and the first gear includes a first gear part, and the second gear comprises a second gear part, and the first gear part and the second gear part are formed to increase a rotational resistance between the first gear and the second gear when the display module rotates in a first direction in the first mode.

17 Claims, 16 Drawing Sheets

(56) References Cited

U.S. PATENT DOCUMENTS

| | | | |
|---|---|---|---|
| 7,815,154 B2* | 10/2010 | Oh | F16M 11/28 |
| | | | 248/176.3 |
| 9,282,670 B2* | 3/2016 | Chiang | G06F 1/1601 |
| 11,519,548 B2* | 12/2022 | Hsu | F16M 11/041 |
| 11,582,877 B2 | 2/2023 | Choi et al. | |
| 11,586,298 B2 | 2/2023 | Lee | |
| 11,744,027 B2* | 8/2023 | Hsu | F16M 11/041 |
| | | | 361/807 |
| 11,889,646 B2* | 1/2024 | Kang | G06F 1/1681 |
| 2007/0205340 A1 | 9/2007 | Jung | |
| 2010/0079494 A1* | 4/2010 | Sung | G06F 3/0346 |
| | | | 345/650 |
| 2015/0381858 A1 | 12/2015 | Sterngren | |
| 2018/0032104 A1* | 2/2018 | Schatz | G06F 1/1683 |
| 2020/0053891 A1* | 2/2020 | Kim | F16M 11/22 |
| 2020/0158278 A1* | 5/2020 | Daugirdas | A61B 6/4405 |
| 2021/0004046 A1* | 1/2021 | Park | F16M 11/105 |
| 2021/0088174 A1 | 3/2021 | Gurr et al. | |
| 2021/0160451 A1 | 5/2021 | Yoon et al. | |
| 2024/0244777 A1* | 7/2024 | Choi | H04N 5/655 |

FOREIGN PATENT DOCUMENTS

| | | |
|---|---|---|
| KR | 10-0606771 B1 | 7/2006 |
| KR | 10-2007-0091467 A | 9/2007 |
| KR | 10-2011-0038559 A | 4/2011 |
| KR | 10-2011-0054349 A | 5/2011 |
| KR | 10-2016-0002366 A | 1/2016 |
| KR | 10-2020-0004567 A | 1/2020 |
| KR | 10-2020-0111437 A | 9/2020 |
| KR | 10-2020-0125382 A | 11/2020 |
| KR | 10-2022-0063488 A | 5/2022 |
| WO | 2019/199454 A1 | 10/2019 |
| WO | 2021/241777 A1 | 12/2021 |

OTHER PUBLICATIONS

Written Opinion (PCT/ISA/210) issued from the International Searching Authority on Jan. 18, 2023 to International Application No. PCT/KR2022/014080.

Communication issued Oct. 10, 2024 by the European Patent Office in European Patent Application No. 22916299.5.

* cited by examiner

DISPLAY APPARATUS INCLUDING ROTATOR FOR ROTATING DISPLAY MODULE

CROSS-REFERENCE TO RELATED APPLICATION

This is a bypass continuation application of PCT/KR2022/014080 filed Sep. 21, 2022, which claims priority from Korean Patent Application No. 10-2021-0189807, filed on Dec. 28, 2021 in the Korean Intellectual Property Office, the disclosure of which is incorporated herein by reference.

BACKGROUND

1. Field

Embodiments of the present disclosure relate to a display apparatus including a display module, and a rotator configured to support and rotate the display module.

2. Description of the Related Art

A display apparatus is a type of an output device configured to convert acquired or stored electrical information into visual information and display the converted electrical information to a user.

The display apparatus may include a display module configured to display an image, and a supporter configured to support the display module. The supporter may be provided to support the display module so that the front of the display module on which the image is displayed can face a viewer. For example, the supporter may include a stand and a wall mount.

In general, the display module has a length of a horizontal side longer than a length of a vertical side. When a vertical image is displayed on a display module in which the length of the horizontal side is longer than the length of the vertical side, it is difficult to efficiently use a screen display area of the display module, and vice versa.

In order to efficiently use the screen display area of the display module, the display apparatus may include a rotator provided to support and rotate the display module.

The overall thickness of the display apparatus may be increased due to the rotator disposed at the rear of the display module.

In addition, when the display module is vertically disposed, the center of rotation and the center of gravity of the display module may not match. Accordingly, the display module may not maintain a vertically disposed state, and the display module may rotate in one direction.

SUMMARY

Therefore, it is an aspect of the present disclosure to provide a rotator having a slim thickness and a display apparatus including the same.

It is another aspect of the present disclosure to provide a rotator configured to prevent a display module from rotating in one direction due to a separation between a center of rotation and a center of gravity of the display module, and a display apparatus including the same.

A display apparatus according to an aspect of the present disclosure includes a display module and a rotator coupled to the display module and provided to rotate the display module between a first mode in which the display module is vertically disposed and a second mode in which the display module is horizontally disposed, and the rotator includes a driving motor configured to provide a driving force, a first gear configured to rotate around a first rotating axis parallel to a driving axis of the driving motor by the driving force from the driving motor, and a second gear configured to mesh with the first gear and rotate around a second rotating axis parallel to the driving axis and the first rotating axis, and the first gear includes a first gear part and the second gear includes a second gear part, and the first gear part and the second gear part are formed to increase a rotational resistance between the first gear and the second gear when the display module rotates in a first direction in the first mode.

The display apparatus may further include a bracket mounted on a rear surface of the display module.

The rotator may be coupled to the display module and mounted on the bracket.

The display module may be provided to rotate around the first rotating axis.

The first gear may further include a disk-shaped first body, and the first gear part is formed along a circumferential surface of the first body.

The second gear may further include a second body, the second gear part being provided to mesh with the first gear part and formed along a circumferential surface of the second body, a third body provided to rotate around the second rotating axis together with the second body and having a diameter greater than an external diameter of the second gear part, and a third gear part formed along a circumferential surface of the third body.

A first screw thread of the first gear part and a second screw thread of the second gear part may be formed to generate a thrust in a direction in which the first body moves toward the third body when the display module rotates in the first direction.

The rotator may further include a third gear configured to mesh with the second gear and rotate around a third rotating axis parallel to the first rotating axis and the second rotating axis, and a driving gear coupled to the driving axis and configured to rotate together with the driving axis.

The third gear may include a fourth body, a fourth gear part provided to mesh with the third gear part and formed along a circumferential surface of the fourth body, a fifth body provided to rotate around the third rotating axis together with the fourth body and having a diameter greater than an external diameter of the fourth gear part, and a fifth gear part formed along a circumferential surface of the fifth body, and the driving gear may be provided to mesh with the fifth gear part.

The first to fifth gear parts and the driving gear may be helical gears.

A thickness of the driving motor may be less than twice a thickness of the second gear.

The rotator may further include a rotating holder coupled to the first gear to rotate around the first rotating axis together with the first gear, and a fixing holder disposed between the first gear and the rotating holder and configured to rotatably support the first gear and the rotation holder.

The rotator may further include a plurality of balls provided to assist in relative rotation of the rotating holder with respect to the fixing holder.

The rotating holder may include a plurality of ball-accommodating grooves provided to accommodate the plurality of balls, respectively.

The fixing holder may include a ball-guide configured to form a path along which the plurality of balls move.

The rotator may further include a disk coupled to the first gear to rotate together with the first gear and including a plurality of slits disposed at regular intervals, and a detecting sensor including a light transmitter disposed at one side of the disk, and a light receiver disposed at the other side of the disk.

The first gear may include a first push protrusion protruding outward in a radial direction of the first gear, and a second push protrusion disposed to be spaced apart from the first push protrusion. The rotator may further include a first switch provided to be pushed by the first push protrusion when the display module is positioned in the first mode, and a second switch provided to be pushed by the second push protrusion when the display module is positioned in the second mode.

A display apparatus according to an aspect of the present disclosure includes a display module, and a rotator coupled to the display module and provided to rotate the display module between a first mode and a second mode, and the rotator includes a driving motor configured to provide a driving force, a first gear configured to rotate around a first rotating axis parallel to a driving axis of the driving motor, and a second gear configured to mesh with the first gear and rotate around a second rotating axis parallel to the driving axis and the first rotating axis, and a first screw thread of the first gear and a second screw thread of the second gear are formed to increase a rotational resistance between the first gear and the second gear when the display module rotates in a direction in the first mode.

In the first mode, the display module may be vertically disposed, and a center of rotation of the display module and a center of gravity of the display module may be positioned on a straight line extending in a gravity direction of the display module, and in the second mode which the display module may be horizontally disposed, and the center of rotation of the display module and the center of gravity of the display module may be not positioned on the straight line extending in the gravity direction of the display module.

The first screw thread of the first gear and the second screw thread of the second gear are formed to generate a thrust of the first gear and the second gear such that the thrust increases the rotational resistance between the first gear and the second gear when the display module rotates in the direction in the first mode.

The first screw thread of the first gear and the second screw thread of the second gear may be formed to generate a first thrust to move a part of the first gear toward a part of the second gear.

The first screw thread of the first gear and the second screw thread of the second gear may be formed to generate a second thrust to move the part of the second gear toward the part of the first gear.

BRIEF DESCRIPTION OF THE DRAWINGS

These and/or other aspects of the disclosure will become apparent and more readily appreciated from the following description of the embodiments, taken in conjunction with the accompanying drawings.

DETAILED DESCRIPTION

Figure 1:
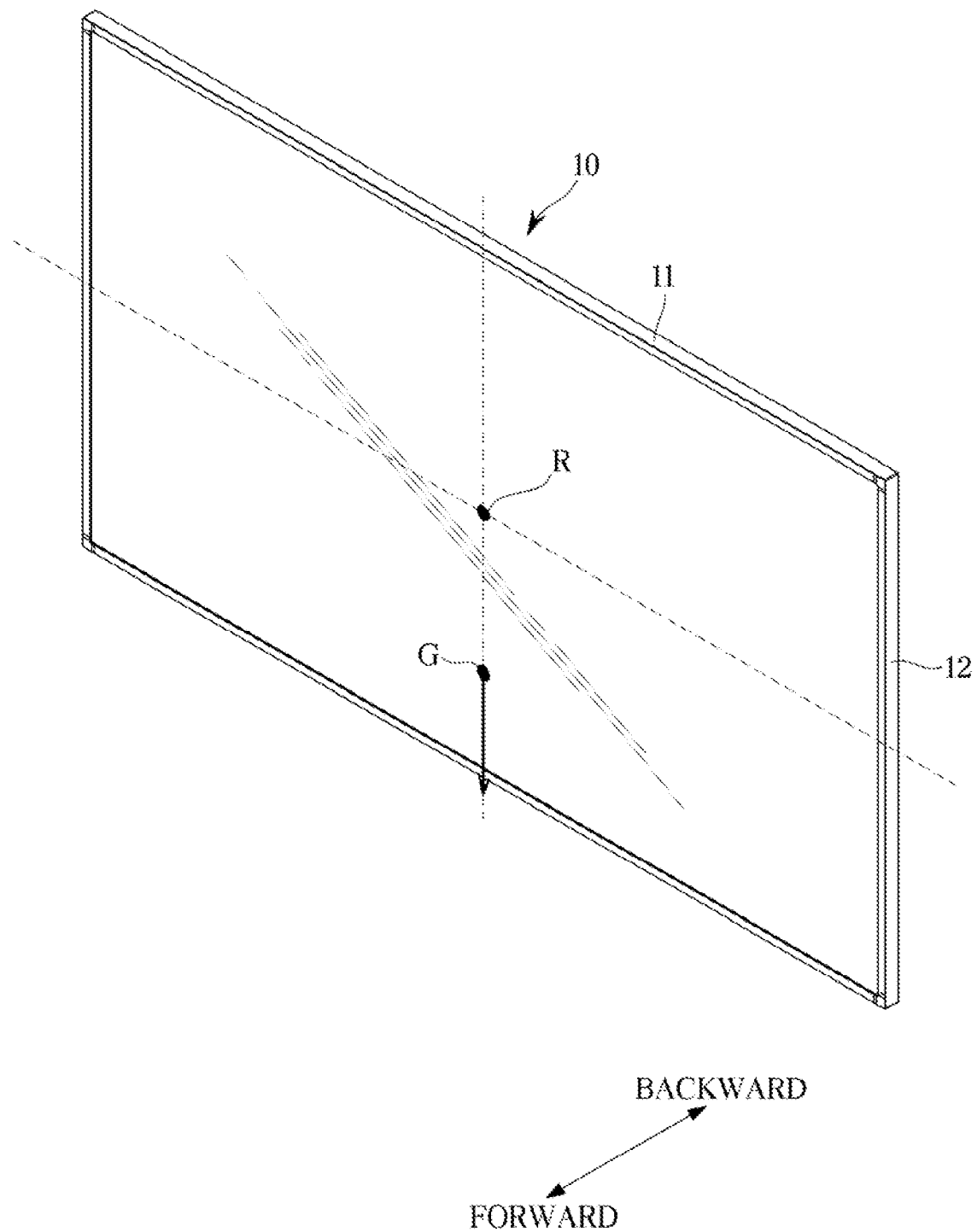
FIG. 1 is a perspective view of a display apparatus in a state in which a display module is horizontally disposed according to an embodiment.

Embodiments described in this specification and configurations shown in the drawings are merely examples of the present disclosure, and there may be various modifications that can be substituted for the embodiments and drawings of this specification at the time of filing of the present disclosure.

In addition, the same reference numbers or reference numerals in each drawing in this specification indicate parts or components that perform substantially the same functions.

In addition, the terms used herein are used to describe the embodiments, and are not intended to limit and/or restrict the present disclosure. The singular expression includes the plural expression unless the context clearly indicates otherwise. In this specification, terms such as "include" or "have" are intended to designate that features, numbers, steps, operations, components, parts, or combinations thereof described in this specification exist, and do not preclude the possibility of the presence or addition of one or more other features, numbers, operations, components, parts or combinations thereof.

In addition, terms including ordinal numbers such as "first" and "second" used in this specification may be used to describe various components, but the components are not limited by the terms, and the terms are used only for the purpose of distinguishing one component from another. For example, without departing from the scope of the present disclosure, a first component may be referred to as a second component, and similarly, a second component may also be referred to as a first component. The term "and/or" includes any combination of a plurality of related listed items or any of a plurality of related listed items.

Meanwhile, the terms "front", "rear", "left" and "right" used in the following description are defined based on the drawings, and the shape and position of each component are not limited by these terms.

Hereinafter, embodiments according to the present disclosure will be described in detail with reference to the accompanying drawings.

Figure 2:
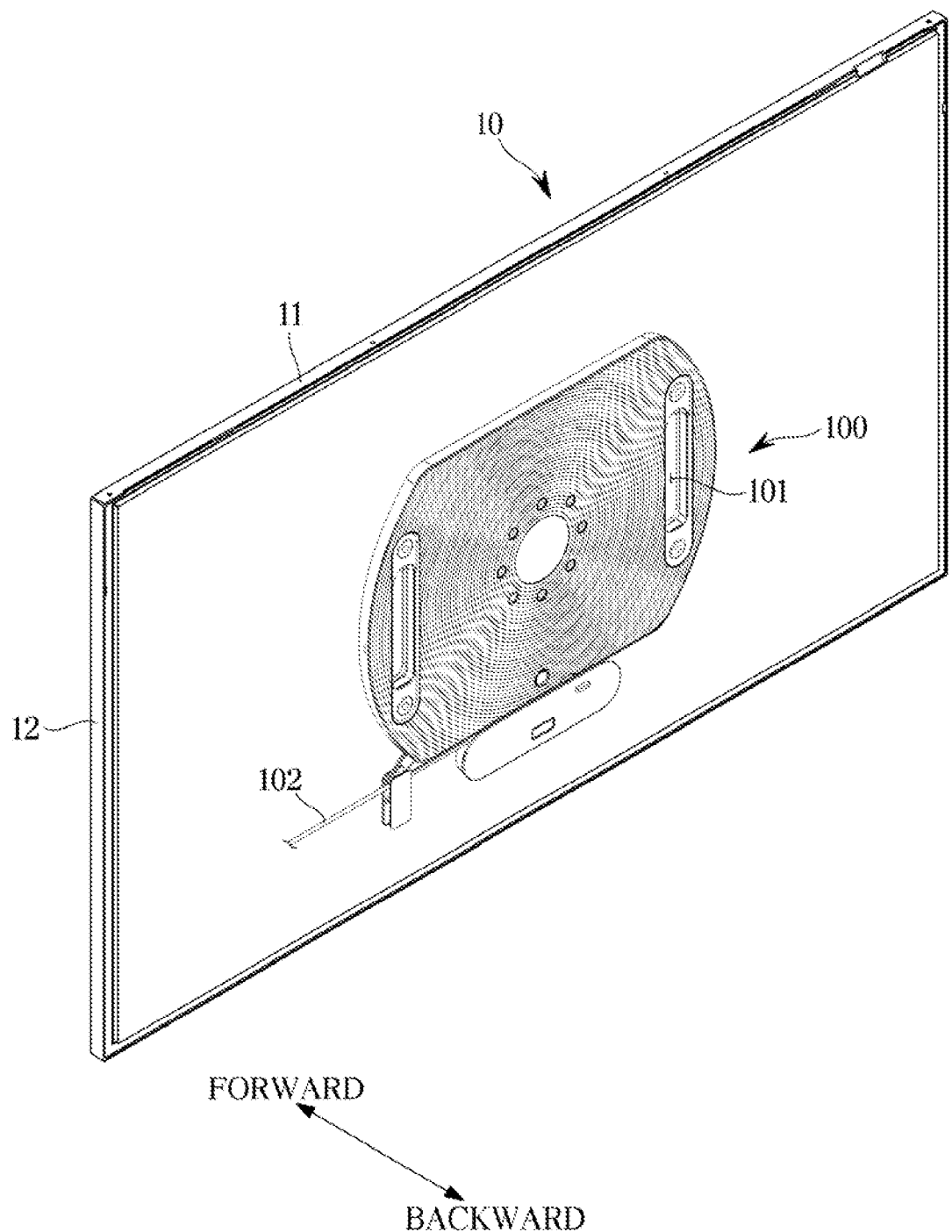
FIG. 2 is a rear perspective view of the display apparatus shown in FIG. 1.
Figure 3:
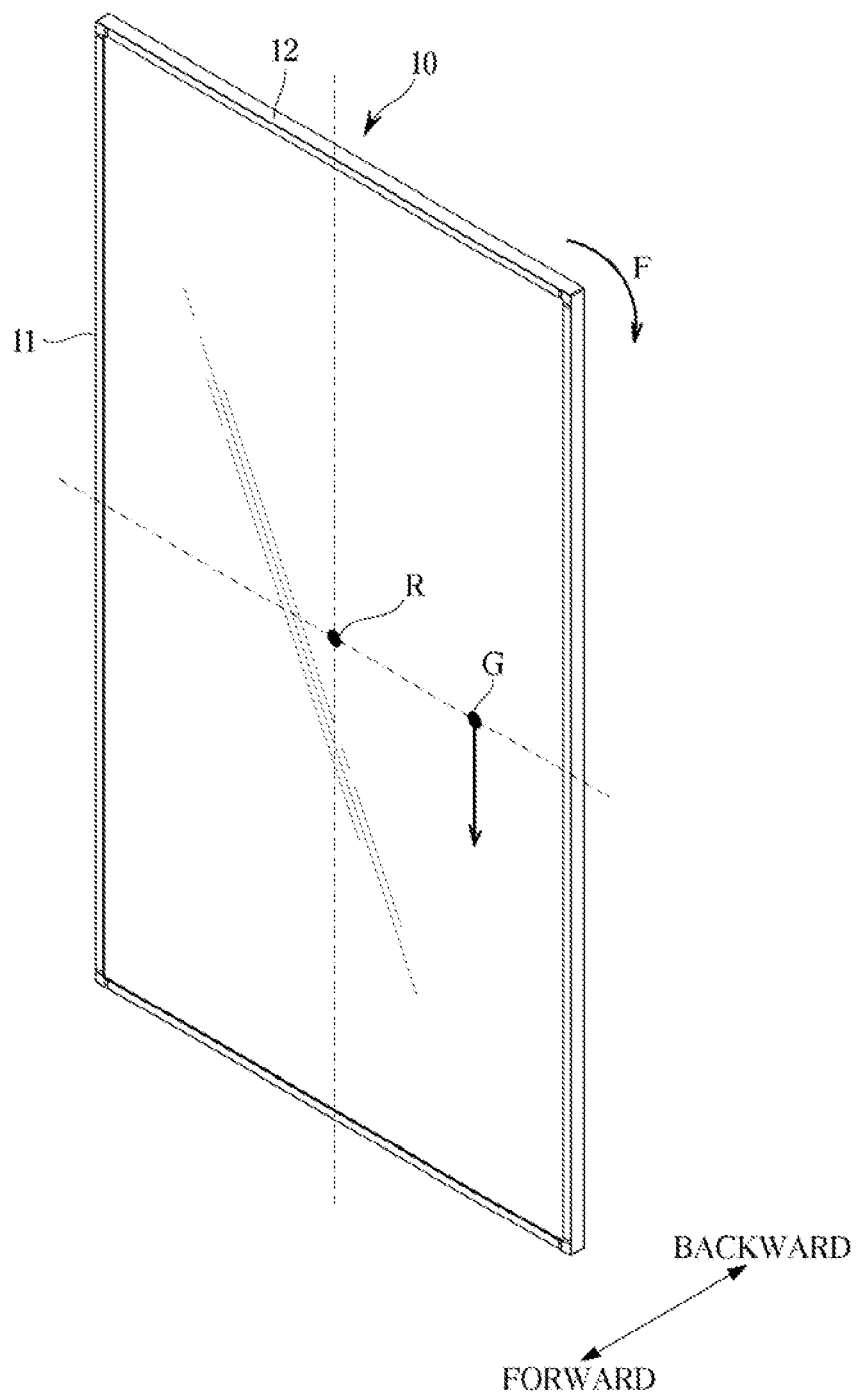
FIG. 3 is a perspective view of a display apparatus in a state in which a display module is vertically disposed according to an embodiment.
Figure 4:
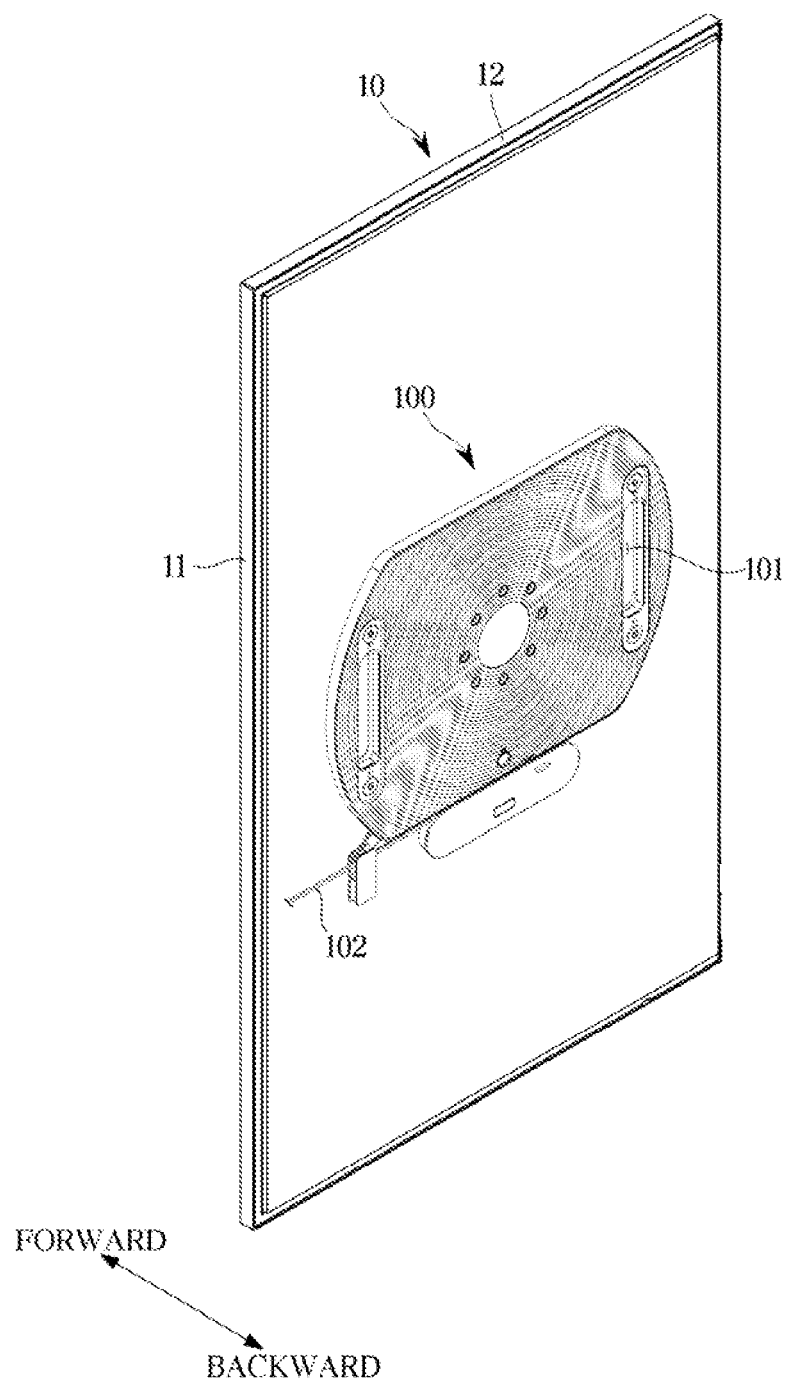
FIG. 4 is a rear perspective view of the display apparatus shown in FIG. 3.

FIG. 1 is a perspective view of a display apparatus in a state in which a display module is horizontally disposed according to an embodiment. FIG. 2 is a rear perspective view of the display apparatus shown in FIG. 1. FIG. 3 is a perspective view of a display apparatus in a state in which the display module is vertically disposed according to an embodiment. FIG. 4 is a rear perspective view of the display apparatus shown in FIG. 3.

The display apparatus includes a display module 10. The display module 10 is a device configured to display information, reference, data, and the like, as characters, figures, graphs, images, and the like, and may include a television, a monitor, and the like.

The display module 10 may be configured to display a screen. The display module 10 may include a self-light emitting display panel (not shown) such as an organic light-emitting diode (OLED) or a passive light-emitting display panel (not shown) such as a liquid crystal display (LCD). There is no particular limitation on the type of a display panel.

The display module 10 may include a horizontal side and a vertical side and the length of the horizontal side and the length of the vertical side are different from each other. That is, the display module 10 may have a long side 11 and a short side 12. The display module 10 may be provided in a rectangular plate shape.

The display apparatus may include a rotator 100. The rotator 100 may be coupled to the rear of the display module 10. The rotator 100 may be provided to support the display module 10 and rotate the display module 10. The rotator 100 may be mounted on a separately provided stand (not shown) or a wall (not shown). A mount protrusion (not shown) may be provided on a stand or a wall and may be inserted into a mount groove 101 of the rotator 100. According to an embodiment, the rotator 100 may be mounted on the stand or the wall by inserting the mount protrusion into the mount groove 101. The display module 10 may be mounted on the stand or the wall by being combined with the rotator 100.

The rotator 100 may receive power through a cable 102 connected to an external power source (not shown). The rotator 100 may rotate the display module 10 by receiving power and driving a driving motor 180 (refer to FIG. 7) which will be described below.

Referring to FIGS. 1 and 3, the display module 10 may be positioned in any one of a first mode in which the long side 11 is vertically disposed and a second mode in which the long side 11 is horizontally disposed. The rotator 100 may be provided to rotate the display module 10 between the first mode and the second mode. The first mode may be referred to as a vertical mode, and the second mode may be referred to as a horizontal mode.

Referring to FIG. 1, when the display module 10 is disposed in the horizontal mode, a center of rotation R of the display module 10 and a center of gravity G of the display module 10 may be positioned on a straight line extending in a gravity direction or on a periphery of the straight line. That is, the center of rotation R and the center of gravity G may be spaced apart from each other in left and right directions, but may not be spaced apart enough to rotate the display module 10.

Referring to FIG. 3, when the display module 10 is disposed in the vertical mode, the center of rotation R of the display module 10 and the center of gravity G of the display module 10 may be spaced apart from each other in the left and right directions. That is, the center of rotation R and the center of gravity G may not be disposed on a straight line extending in the gravity direction or on the periphery thereof. In general, the center of gravity G of the display module 10 is designed based on in a state that the display module 10 is horizontally disposed. Accordingly, when the display module 10 is horizontally disposed, the center of gravity G is provided at or adjacent to a center of the display module 10, but when the display module 10 is vertically disposed, the center of gravity G may be spaced apart from the center of the display module 10 in the left and right directions.

When the center of gravity G of the display module 10 is spaced apart from the center of rotation R in the left and right directions, the display module 10 may receive a force F to rotate in one direction due to weight eccentricity. If there is no device or structure capable of enduring this force F, the display module 10 may not be able to maintain a state of being disposed in the vertical mode. In this case, the display module 10 may achieve weight balance at one position between the vertical mode and the horizontal mode, and may maintain a state of being disposed at the one position.

In order to prevent the display module from rotating in one direction without maintaining the state disposed in the vertical mode, a worm gear and a worm wheel gear may be used so that a driving axis of the driving motor configured to provide a driving force to rotate the display module and a rotating axis of the display module intersect 90 degrees. The above problem may be solved using the characteristic that the worm gear may rotate the worm wheel gear, but the worm wheel gear may not rotate the worm gear. However, the worm gear and the worm wheel gear have relatively low power transmission efficiency and thus require a high-output driving motor, and for this reason, there is a problem that the thickness of the driving motor becomes thicker.

In an embodiment, the total thickness of the display module 10 and the rotator 100 may be minimized by minimizing the thickness of the rotator 100. Considering the slim thickness of the rotator 100, it is necessary to minimize the thickness of the driving motor by improving the power transmission efficiency. A detailed structure related to this will be described below.

Figure 5:
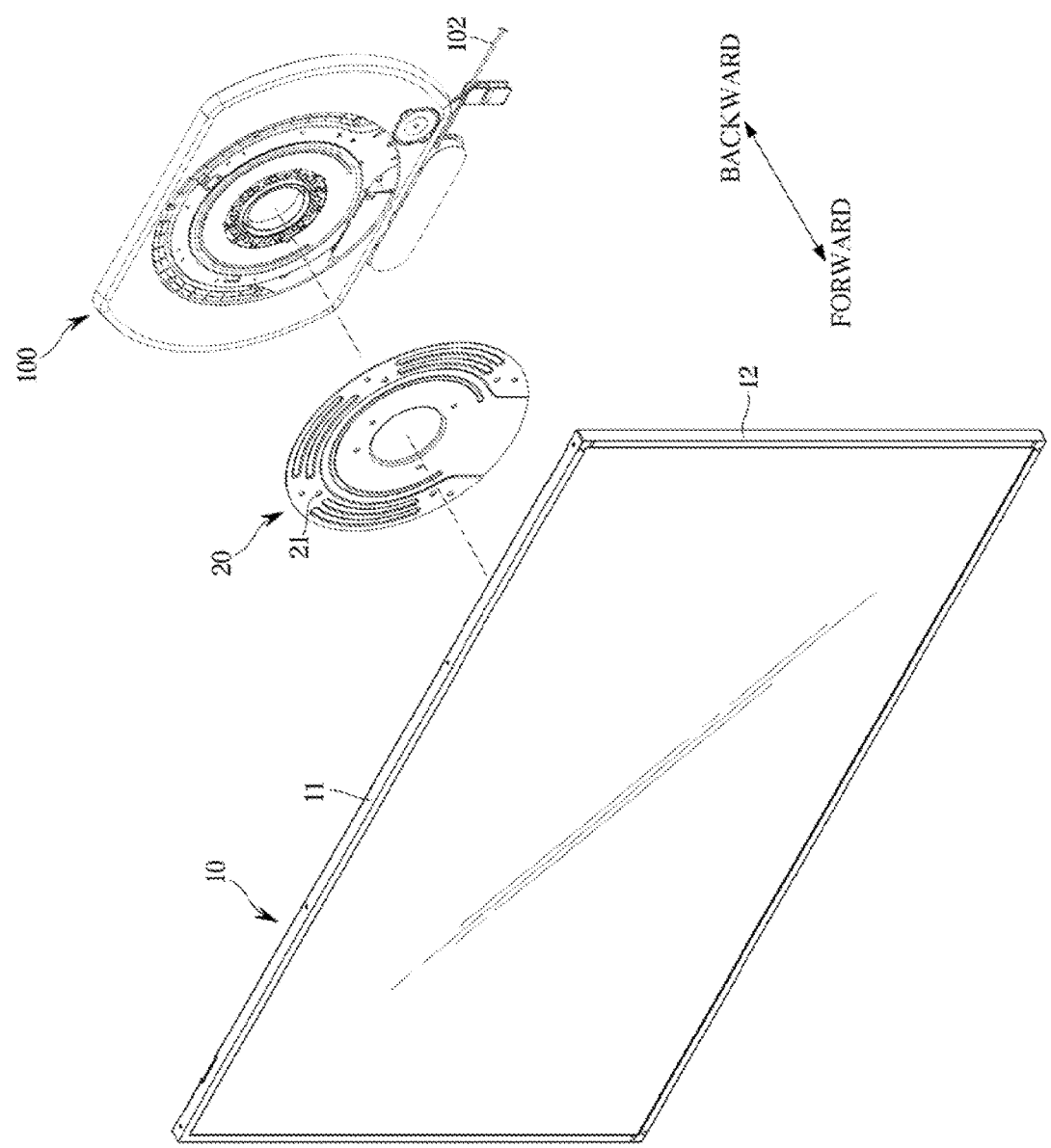
FIG. 5 is a view illustrating a state in which a display module, a bracket, and a rotator are separated from each other in a display apparatus from an angle according to an embodiment.
Figure 6:
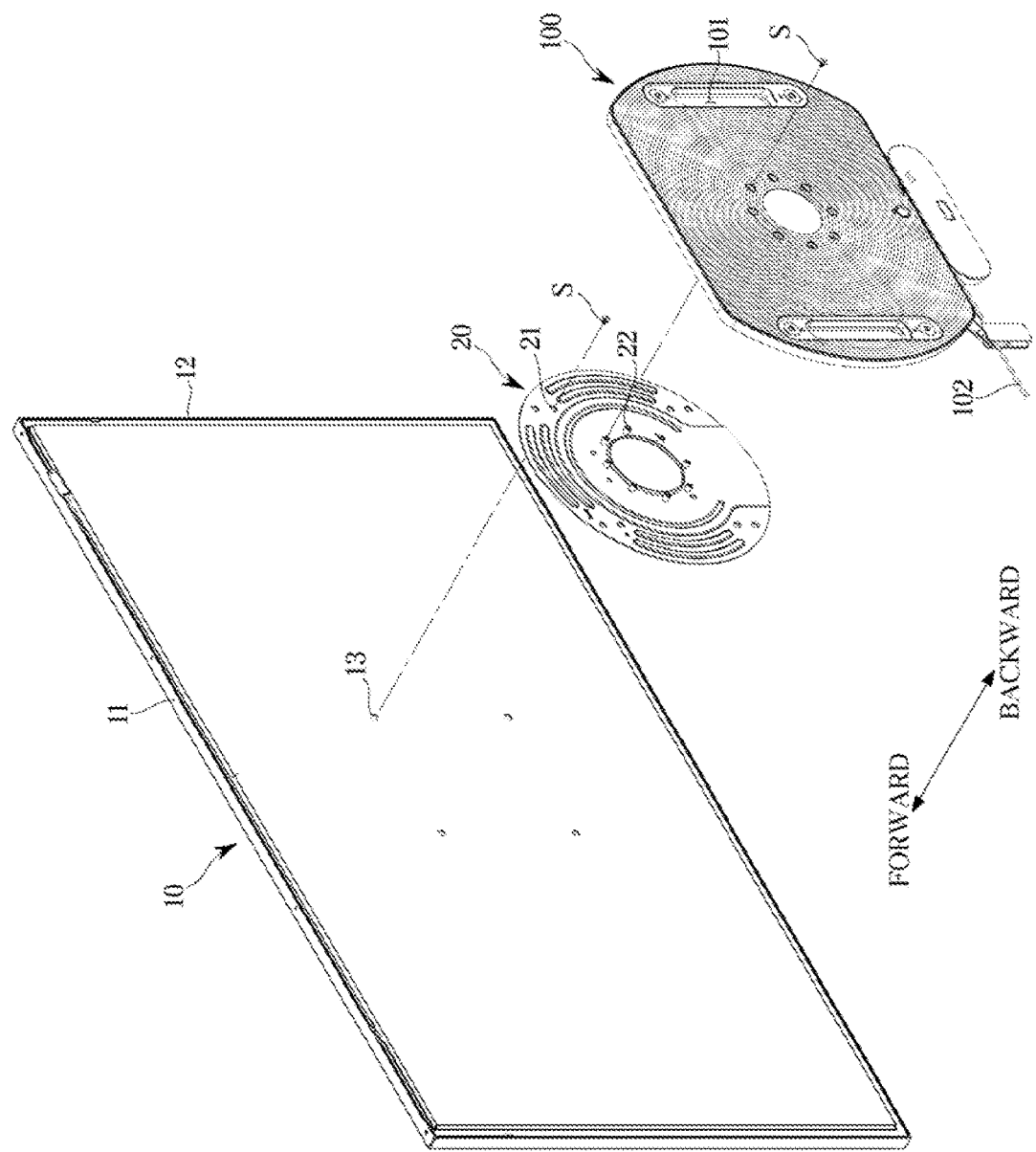
FIG. 6 is a view illustrating the display apparatus shown in FIG. 5 from another angle.

FIG. 5 is a view illustrating a state in which a display module, a bracket, and a rotator are separated from each other in a display apparatus from an angle according to an embodiment. FIG. 6 is a view illustrating the display apparatus shown in FIG. 5 from another angle.

According to an embodiment, a bracket 20 may be provided between the display module 10 and the rotator 100.

Specifically, the bracket 20 may be coupled to the rear surface of the display module 10. The bracket 20 may be coupled to the display module 10 to rotate together with the display module 10. The bracket 20 may include a bracket hole 21. The bracket hole 21 may be provided in plurality. The bracket hole 21 may be provided to correspond to a module hole 13 provided on the rear surface of the display module 10. A fastening member S such as a screw may couple the bracket 20 to the rear surface of the display module 10 by being fastened to the module hole 13 through the bracket hole 21.

The rotator 100 may be coupled to the bracket 20. The rotator 100 may be coupled to the display module 10 by being coupled to the bracket 20. The rotator 100 may be provided to rotate the bracket 20. The rotator 100 may rotate the display module 10 coupled to the bracket 20 by rotating the bracket 20. The bracket 20 may include a bracket boss 22. The bracket hole 21 may be provided in plurality. The fastening member S such as a screw may couple the rotator 100 to the bracket 20 by being fastened to the bracket boss 22 from the rear of the rotator 100.

Figure 7:
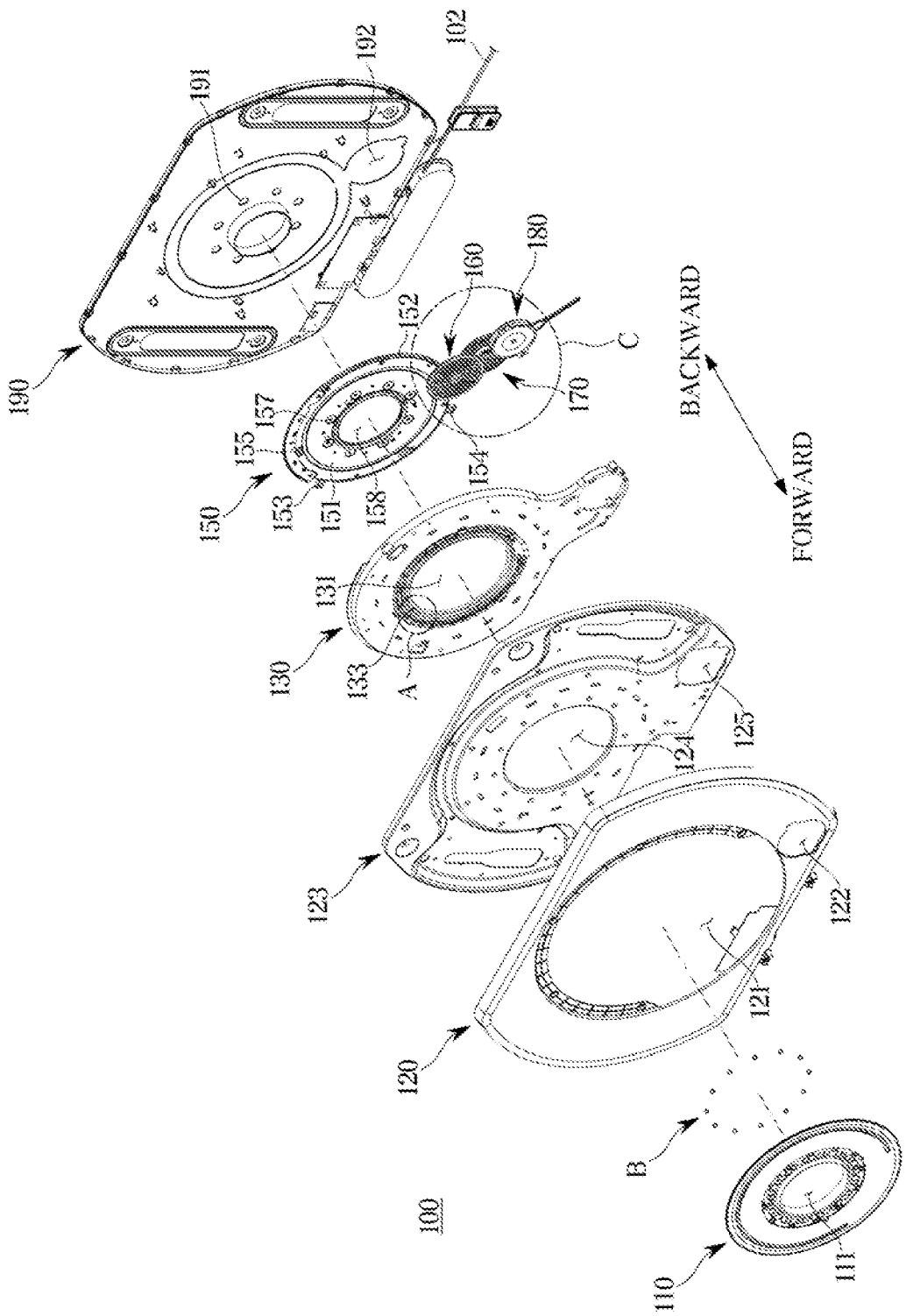
FIG. 7 is an exploded perspective view of a rotator in a display apparatus according to an embodiment.
Figure 8:
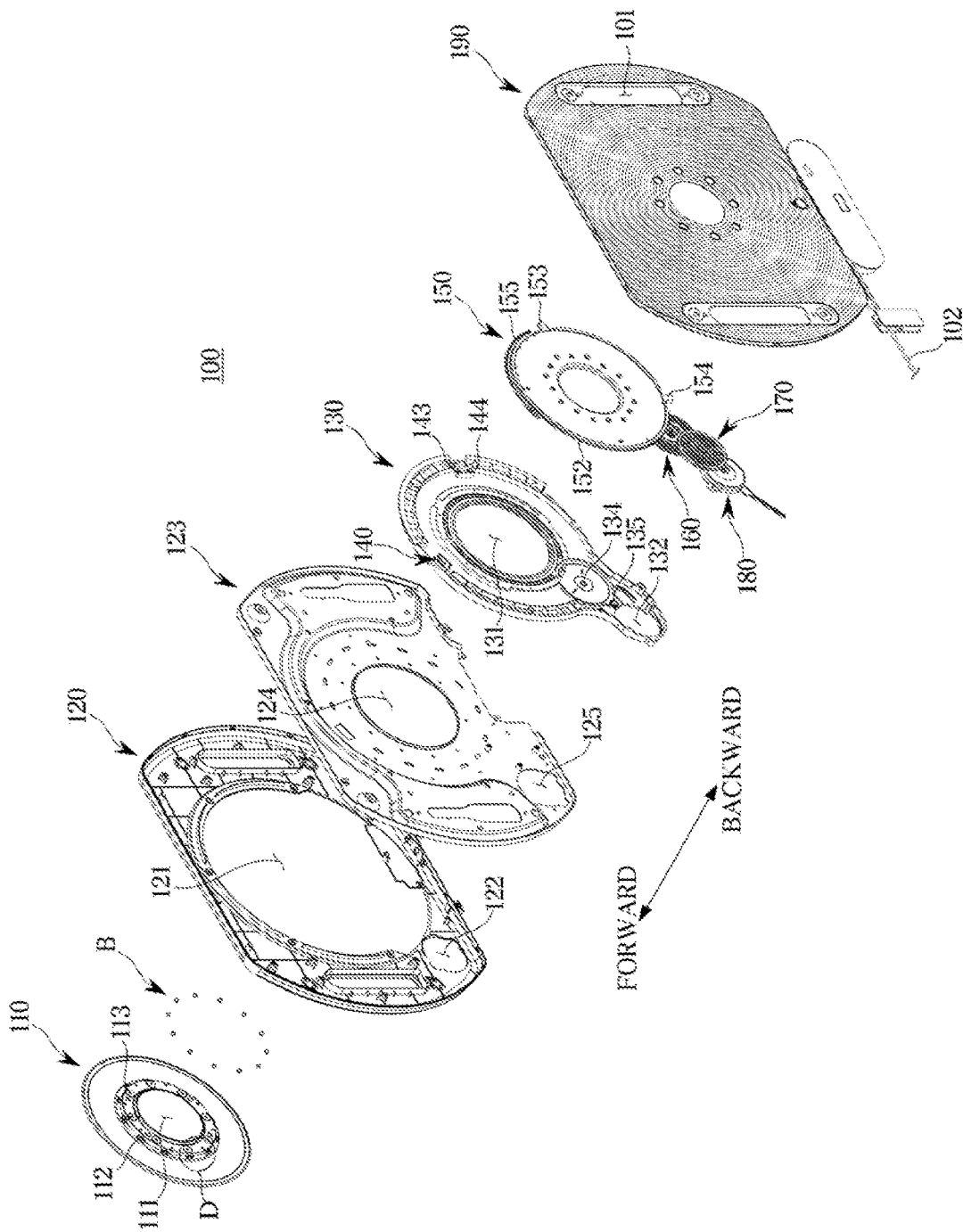
FIG. 8 is a view illustrating the rotator shown in FIG. 7 from another angle.

FIG. 7 is an exploded perspective view of a rotator in a display apparatus from an angle according to an embodiment. FIG. 8 is a view illustrating the rotator shown in FIG. 7 from another angle.

Hereinafter, the structure of the rotator 100 according to an embodiment will be described in detail with reference to FIGS. 7 and 8.

Referring to FIGS. 7 and 8, the rotator 100 according to an embodiment may include a rotating holder 110 coupled to the bracket 20 to rotate together with the bracket 20, a first case 120 to which the rotating holder 110 is coupled to be relatively rotatable, a case reinforcing member 123 coupled to the first case 120 to reinforce the strength of the first case 120, a fixing holder 130 coupled to be fixed to the first case 120, a first gear 150 coupled to the rotating holder 110 to rotate together with the rotating holder 110, a second gear 160 and a third gear 170 configured to rotate in conjunction with the first gear 150, a driving motor 180 configured to provide a driving force, and a second case 190 coupled to the first case 120 to form an exterior of the rotator 100. According to an embodiment, the rotator 100 may include the third gear 170 to increase a gear ratio. Alternatively, the rotator 100 may include the first gear 150 and the second gear 160, but may not include the third gear 170.

The rotating holder 110 may be coupled to the bracket 20. The rotating holder 110 may include a first fastening hole 113. The first fastening hole 113 may be provided in plurality. The fastening member S may be coupled to the bracket boss 22 through the first fastening hole 113.

The rotating holder 110 may include a first hollow 111 in a center of the rotating holder 110. The first hollow 111 may be formed through a center of rotation of the rotating holder 110 and its periphery so that a flexible printed circuit board (FPCB), and the like are not twisted by the rotation of the display module 10. When connection through the flexible printed circuit board (FPCB) is not required, for example, when the rotator 100 is provided to enable wireless connection, the rotating holder 110 may not include the first hollow 111.

The rotating holder 110 may include a ball-accommodating groove 112 provided to receive a ball B. A plurality of ball-accommodating grooves 112 may be provided to correspond to the number of balls B. The ball B accommodated in the ball-accommodating groove 112 may rotate in the ball-accommodating groove 112. As the ball B rotates in the ball-accommodating groove 112, the rotating holder 110 can rotate smoothly with respect to the fixing holder 130. In addition, it is possible to maintain an interval in a front-rear direction between the rotating holder 110 and the fixing holder 130.

The first case 120 may accommodate the fixing holder 130, the first to third gears 150, 160, and 170, and the driving motor 180 therein by being coupled to the second case 190.

The first case 120 may include a second hollow 121 having a larger diameter than a diameter of the first hollow 111. In addition, the first case 120 may include a first motor hole 122 provided so that the driving motor 180 is inserted into the first motor hole 122.

The case reinforcing member 123 may be coupled to the first case 120 to reinforce the strength of the first case 120. The first case 120 and the second case 190 may be formed of an injection-molded material. Since the injection-molded material may be damaged due to a weak strength, the case reinforcing member 123 made of a metal material may be coupled to the first case 120 to reinforce the strength of the first case 120 and the second case 190.

The case reinforcing member 123 may include a third hollow 124 having a smaller diameter than a diameter of the second hollow 121 and a larger diameter than the diameter of the first hollow 111. In addition, the case reinforcing member 123 may include a second motor hole 125 that corresponds to the first motor hole 122 and is provided so that the driving motor 180 is inserted into the second motor hole 125.

The fixing holder 130 may be coupled to be fixed inside the first case 120 and the second case 190. Unlike the rotating holder 110, the fixing holder 130 may be provided to maintain a fixed state regardless of the rotation of the display module 10.

The fixing holder 130 may include a fourth hollow 131 corresponding to the third hollow 124 and a third motor hole 132 corresponding to the second motor hole 125. The fixing holder 130 may include a ring-shaped ball-guide 133 provided to guide the ball B. The ball-guide 133 may be provided in the form of a groove into which the ball B is inserted. The ball-guide 133 may form a movement path of the ball B.

The fixing holder 130 may include a first gear coupler 134 to which the second gear 160 is coupled, and a second gear coupler 135 to which the third gear 170 is coupled. The fastening member S1 (refer to FIG. 11) is fastened to the first gear coupler 134 through the second gear 160, so that the second gear 160 may be rotatably coupled to the first gear coupler 134. Similarly, the fastening member S2 (refer to FIG. 11) is fastened to the second gear coupler 135 through the third gear 170, so that the third gear 170 may be rotatably coupled to the second gear coupler 135.

A detecting sensor 140 provided to detect the amount of rotation of the first gear 150 may be coupled to the fixing holder 130. A first switch 143 may be provided in the fixing holder 130 so that the first switch 143 is pushed by a first push protrusion 153 of the first gear 150 when the display module 10 is disposed in the horizontal mode. In addition, a second switch 144 may be provided in the fixing holder 130 so that the second switch 144 is pushed by a second push protrusion 154 of the first gear 150 when the display module 10 is disposed in the vertical mode.

The first gear 150 may be coupled to the rotating holder 110 to rotate together with the rotating holder 110. The first gear 150 may include a fifth hollow 158 corresponding to the fourth hollow 131. The first gear 150 may include a second fastening hole 157 corresponding to the first fastening hole 113 so as to be coupled to the rotating holder 110. The fastening member S may be coupled to the bracket boss 22 through the second fastening hole 157 and the first fastening hole 113.

The first gear 150 may include a disk-shaped first body 151 and a first gear part 152 formed along a circumferential surface of the first body 152. According to an embodiment, the first gear part 152 may be provided as a helical gear. In addition, the first gear 150 may include the first push protrusion 153 protruding from a circumferential surface of the first body 152 in a radial direction of the first body 152, and the second push protrusion 154 disposed to be spaced apart from the first push protrusion 153.

In addition, a disk 155 including a plurality of slits 156 may be coupled to the first gear 150. The disk 155 may be coupled to an edge of one area of the first gear 150, and the one area may be approximately ¼ of a circumference of the disk 155. In other words, the disk 155 may be provided over a range of approximately 90 degrees along the circumferential direction of the first gear 150.

The second gear 160 may be provided to mesh with the first gear 150, and the third gear 170 may be provided to mesh with the second gear 160 and a driving gear 181 of the driving motor 180. This will be described below.

The second case 190 may include a case hole 191. The case hole 191 may be provided to correspond to the first fastening hole 113 and the second fastening hole 157, and may have a larger diameter than an outer diameter of the fastening member S. As the case hole 191 has a diameter larger than that of the fastening member S, the fastening member S may not interfere with the second case 190 after the fastening member S passes through the case hole 191 and is coupled to the first gear 150, the rotating holder 110, and the bracket 20. In other words, even when the fastening member S is coupled to the bracket boss 22 through the case hole 191, the second fastening hole 157, and the first fastening hole 113, the second case 190 and the bracket 20 may be rotated relatively to each other.

The second case 190 may include a motor groove 192 into which the driving motor 180 is inserted.

As the first case 120, the case reinforcing member 123, the fixing holder 130, and the second case 190 include the first to third motor holes 122, 125, and 132, and the motor groove 192, the driving motor 180 is accommodated in the first case 120 and the second case 190, and a part of the driving motor 180 may protrude to the outside of the first case 120. Accordingly, the driving motor 180 may be accommodated in the first case 120 and the second case 190 even when the thickness of the driving motor 180 is slightly thicker than the thickness of the rotator 100. In addition, it is possible to prevent the overall thickness of the rotator 100 from becoming thicker. In addition, when the driving motor 180 is accommodated in the first case 120 and the second case 190, it is possible to prevent the rotator 100 from increasing in thickness due to the thickness of the case and a gap between the driving motor 180 and the case.

Figure 9:
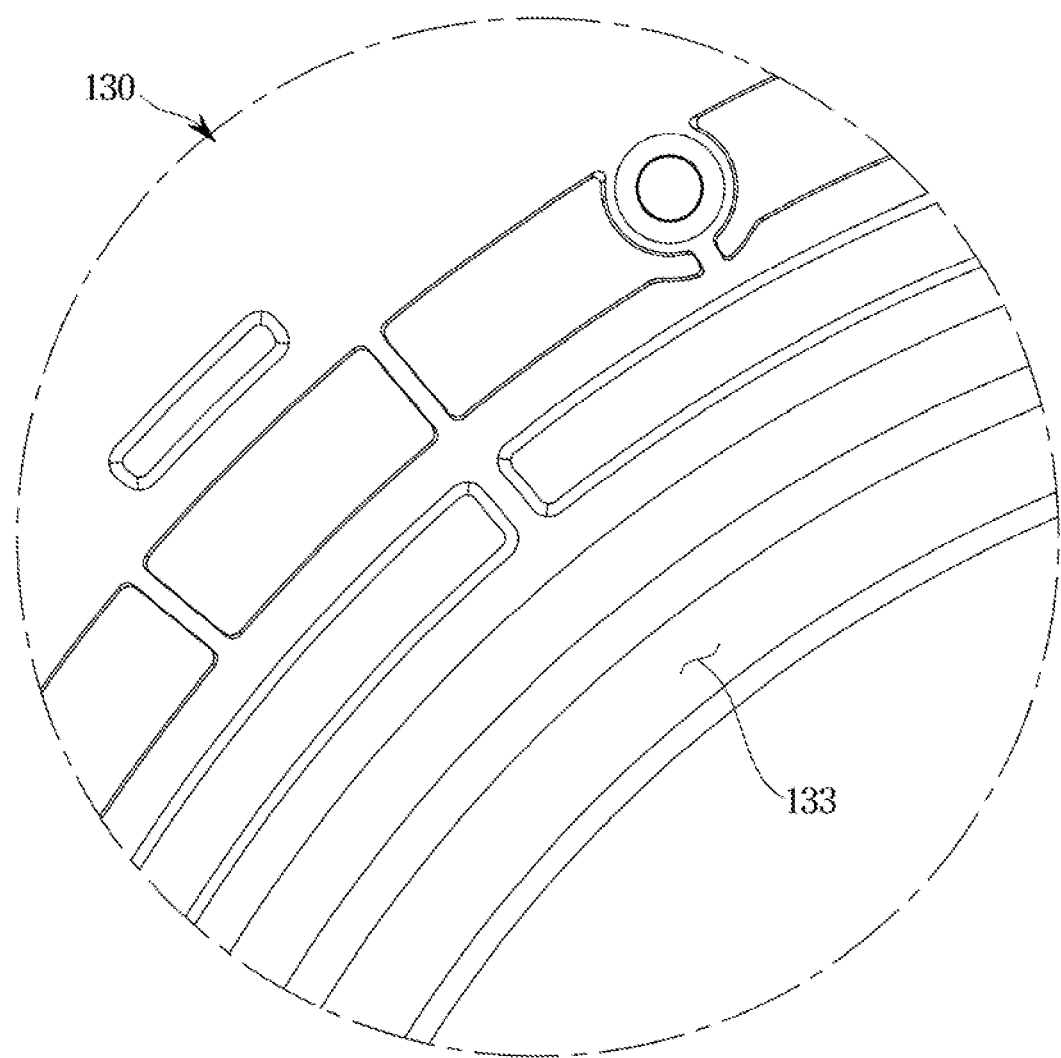
FIG. 9 is an enlarged view of a portion A of FIG. 7 viewed from the front.
Figure 10:
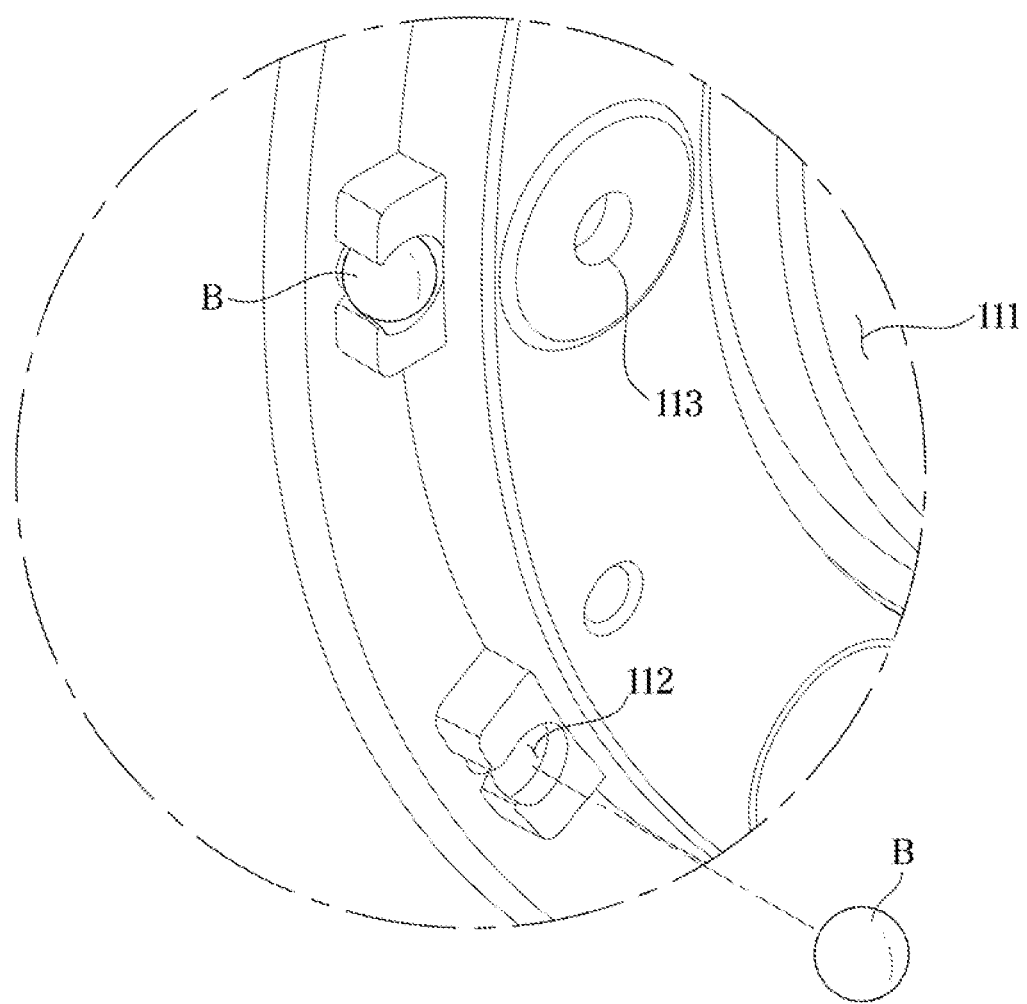
FIG. 10 is an enlarged view of a portion D of FIG. 8.

FIG. 9 is an enlarged view of a portion A of FIG. 7 viewed from the front. FIG. 10 is an enlarged view of a portion D of FIG. 8.

Referring to FIG. 9, the fixing holder 130 may include the ball-guide 133 provided so that the ball B is accommodated and configured to form a movement path of the ball B. The ball-guide 133 may be provided in a ring-shape to form the movement path of the ball B accommodated in the ball-accommodating groove 112 as a circle. The ball-guide 133 may be provided in the form of a groove formed by a depression of a part of the fixing holder 130.

Referring to FIG. 10, the rotating holder 110 may include the ball-accommodating groove 112. The ball B rotatably accommodated in the ball-accommodating groove 112 may move along the above-described ball-guide 133. By providing a plurality of balls B between the rotating holder 110 and the fixing holder 130, a distance between the rotating holder 110 and the fixing holder 130 in the front-rear direction may be constantly maintained. In addition, when the rotating holder 110 rotates with respect to the fixing holder 130, the rotating holder 110 may rotate smoothly by reducing friction.

Figure 11:
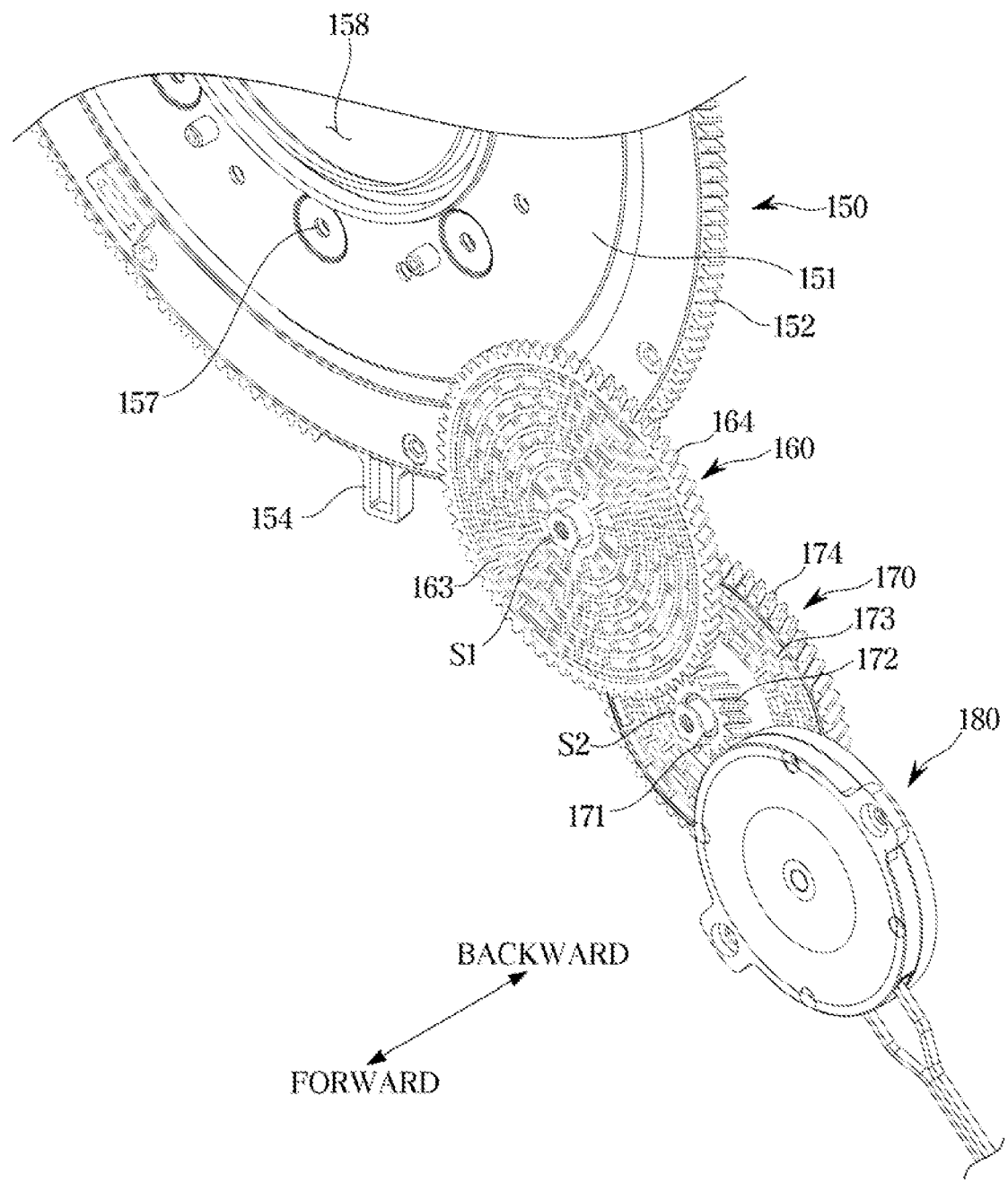
FIG. 11 is an enlarged view of a portion C of FIG. 7.
Figure 12:
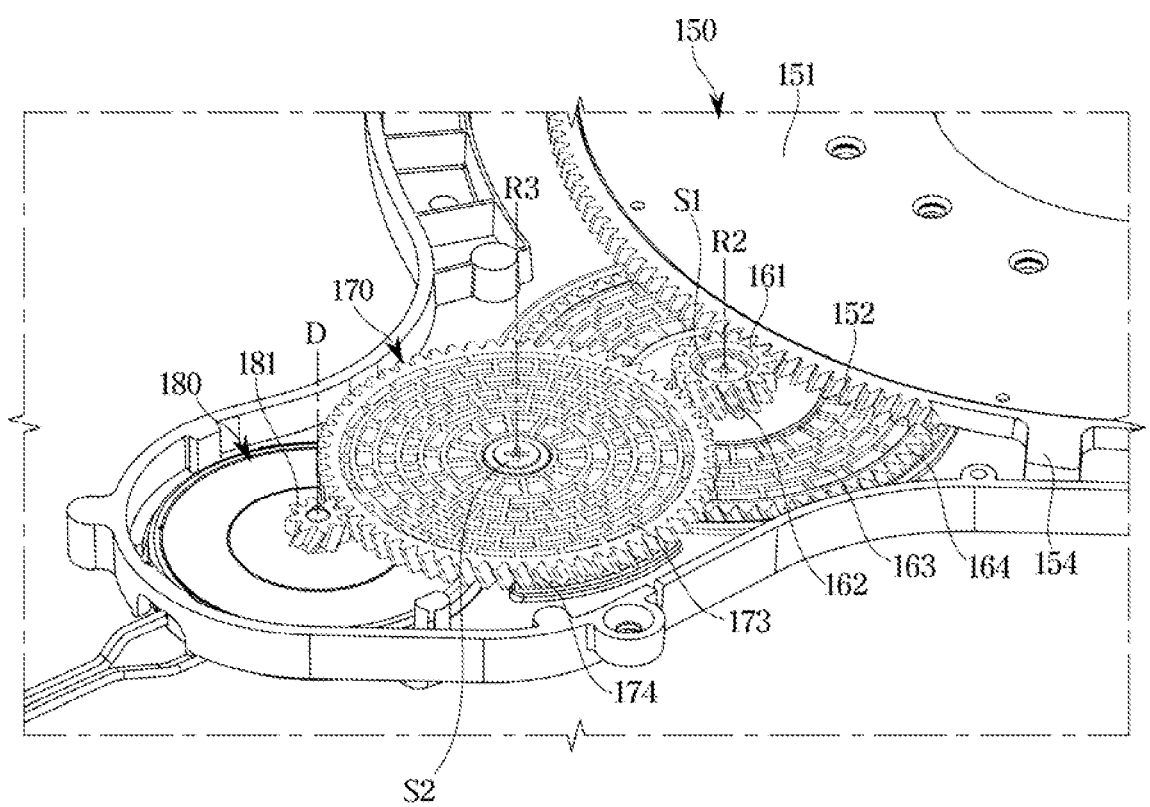
FIG. 12 is a view illustrating first to third gears and a driving motor in a display apparatus according to an embodiment.

FIG. 11 is an enlarged view of a portion C of FIG. 7. FIG. 12 is a view illustrating first to third gears and a driving motor in a display apparatus according to an embodiment.

Referring to FIGS. 11 and 12, in the display apparatus according to an embodiment, the first gear 150 may include the disk-shaped first body 151, and the first gear part 152 formed along a circumferential surface of the first body 151.

The second gear 160 may include a second body 161, a second gear part 162 formed along a circumferential surface of the second body 161, a third body 163 having the same rotation axis as the second body 161, and a third gear part 164 formed along a circumferential surface of the third body 163.

The third gear 170 may include a fourth body 171, a fourth gear part 172 formed along a circumferential surface of the fourth body 171, a fifth body 173 having the same rotation axis as the fourth body 171, and a fifth gear part 174 formed along a circumferential surface of the fifth body 173.

The driving motor 180 may include the driving gear 181 configured to rotate around a driving axis D. The driving axis D of the drive motor 180, a first rotation axis R1 of the first gear 150 (refer to FIG. 13), a second rotation axis R2 of the second gear 160, and a third rotation axis R3 of the third gear may be provided parallel to each other. Accordingly, in the process of transmitting the driving force from the driving motor 180 to the third gear 170, the second gear 160, and the first gear 150, the rotation axes may not be turned by 90 degrees and may be maintained in parallel.

According to an embodiment, the driving motor 180 may be a step motor. Since the driving motor 180 is provided as a step motor, and as described above, there is no 90 degrees turn of the rotation axis, and the worm and the worm wheel gear are not used, and power loss may be reduced. In other words, the power transmission efficiency of the driving motor 180 may be improved.

According to an embodiment, the first to third gears 150, 160, and 170 and the driving gear 181 may include helical gears. A helical gear includes a plurality of teeth having an inclined angle relative to the axis of the helical gear. The helical gear has excellent gear meshing, so that the power transmission efficiency is high, and the gear meshing is continuously performed, and thus the noise is low compared to a normal gear. In addition, since the meshing area of the gear is wide, less strength is required compared to the normal gear, and accordingly, a tooth width can be designed slimly. As described above, the rotator 100 according to an embodiment may reduce its thickness by using a step motor and a plurality of helical gears rotating in conjunction with the step motor.

Referring to FIGS. 11 and 12, the second gear part 162 of the second gear 160 may be provided to mesh with the first gear part 152. The first gear part 152 of the first gear 150 includes a plurality of first teeth and the second gear part 162 of the second gear 160 includes a plurality of second teeth. In addition, the diameter of the third body 163 may be greater than the diameter of the second body 161. The fourth gear part 172 of the third gear 170 may be provided to mesh with the third gear part 164. The diameter of the fifth body 173 may be greater than the diameter of the fourth body 171. The driving gear 181 may be provided to mesh with the fifth gear part 174.

According to the above structure, a gear ratio between the driving gear 181 and the first gear part 152 may be 400 or more. In addition, according to an embodiment, the diameter of the first gear 150 may be 80 mm or more. Since the diameter of the first gear 150 is 80 mm or more, the gear ratio may be set to 400 or more without further increasing the number of gears. As the gear ratio is set to 400 or more, the display module 10 may be rotated using the driving motor 180 having a relatively low output.

Figure 13:
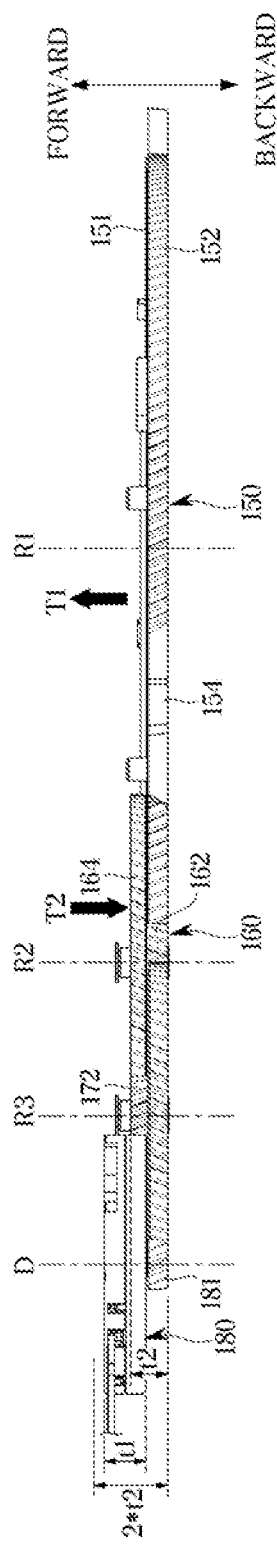
FIG. 13 is a side view illustrating first to third gears and a driving motor in a display apparatus according to an embodiment.

FIG. 13 is a side view illustrating first to third gears and a driving motor in a display apparatus according to an embodiment.

Referring to FIG. 13, a thickness t1 of the driving motor 180 may be less than twice a thickness t2 of the second gear 160. That is, it may be t1<2*t2. More specifically, the sum of the thicknesses of the driving motor 180 and the driving gear 181 may be less than twice the thickness (2*t2) of the second gear 160. Accordingly, since the thickness of the driving motor 180 is relatively slim, the thickness of the rotator 100 may be slimmed.

As described above, when the display module 10 is disposed in the vertical mode, the center of rotation R and the center of gravity G are spaced apart from each other in a horizontal direction, thereby receiving a force F to rotate the display module 10 in one direction. When the driving motor 180 is turned off, the display module 10 may not be maintained in the state in which the display module 10 is disposed in the vertical mode due to the force F, and may rotate within a predetermined range in one direction.

In order to maintain the state in which the display module 10 is disposed in the vertical mode regardless of on/off of the driving motor 180, a rotational force transmitted from the first gear 150 to the driving motor 180 through the second gear 160 and the third gear 170 should be reduced. In order to reduce the rotational force, the rotational resistance in the first gear 150 to the third gear 170 should be increased.

According to an embodiment, the rotational resistance may be increased by using the thrust of the first to fifth gear parts 152, 162, 164, 172, and 174 provided as helical gears. In particular, the thrust from the first gear part 152 and the second gear part 162 has a great influence on the increase in overall rotational resistance.

Referring to FIG. 13, a screw thread of the first gear 150 and a screw thread of the second gear 160 may be formed so that the thrust generated from the first gear 150 and the second gear 160 increases the rotational resistance between the first gear 150 and the second gear 160, when the display module 10 rotates in one direction in the vertical mode.

Specifically, a direction in which the screw thread of the first gear part 152 is formed and a direction in which the screw thread of the second gear part 162 is formed, may be formed to generate the thrust in a direction in which the first body 151 moves toward the third body 163. As shown in FIG. 13, when the display module 10 rotates in one direction from the vertical mode to the horizontal mode, a thrust T1 is generated so that the first body 151 moves toward the third body 163. At the same time, a thrust T2 is generated so that the third body 163 moves toward the first body 151. Similarly, when a thrust is generated so that the first body 151 and the third body 163 come closer to each other, the rotational resistance of the first gear 150 and the second gear 160 may increase. Likewise, the rotational resistance may also be increased in the second gear 160 and the third gear 170.

As described above, by using the thrust of the helical gear, it is possible to increase the rotational resistance when the display module 10 moves from the vertical mode to the horizontal mode without adding separate components. By increasing the rotational resistance, it is possible to prevent the display module 10 disposed in the vertical mode from rotating in one direction without maintaining the vertical mode.

As described above, according to an embodiment, the display module 10 may be maintained in the vertical mode without reducing the thickness of the rotator 100 and adding a separate component such as a breaker. In the state of being disposed in the horizontal mode, since the separation between the center of gravity G and the center of rotation R is not large, the problem does not occur, and thus the state of being disposed in the horizontal mode may also be maintained.

Figure 14:
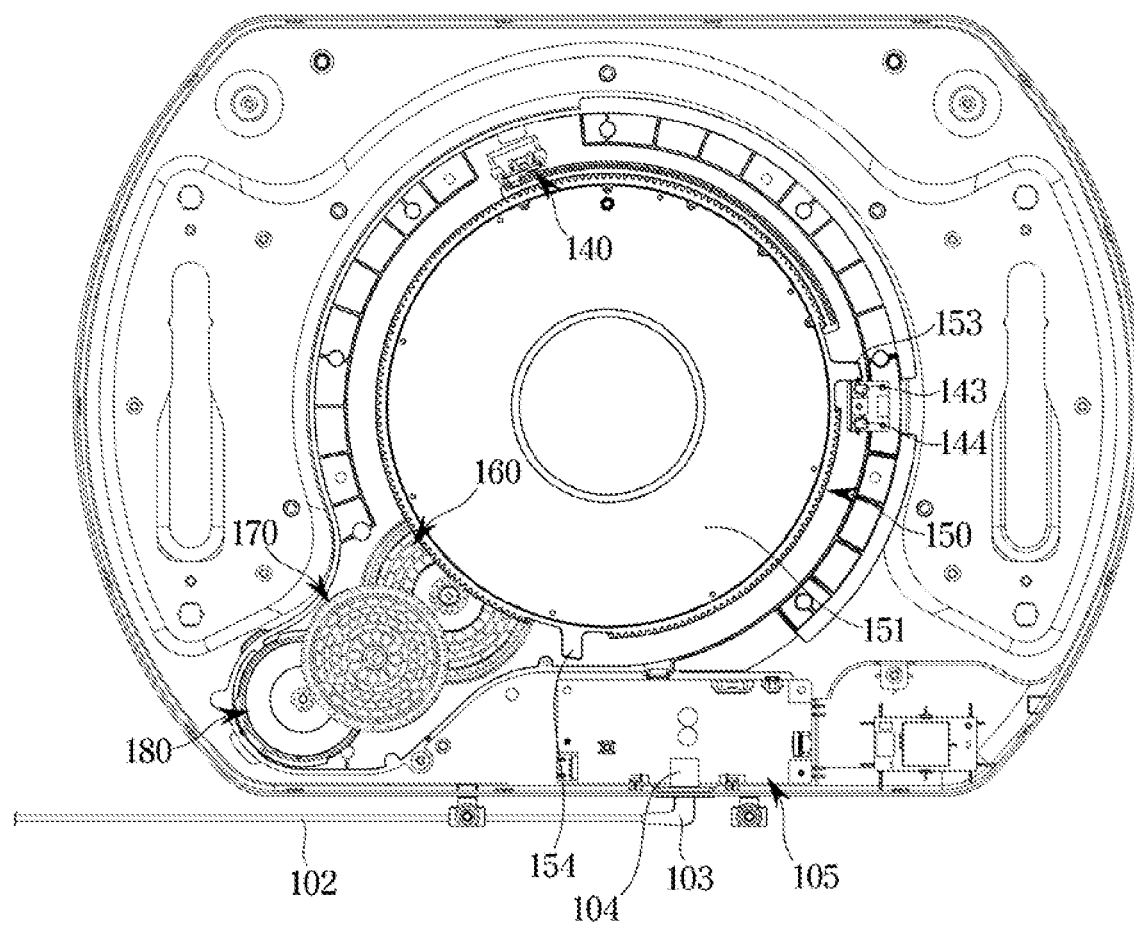
FIG. 14 is a view illustrating the inside of a rear surface of a rotator when a display module is horizontally disposed in a display apparatus according to an embodiment.
Figure 15:
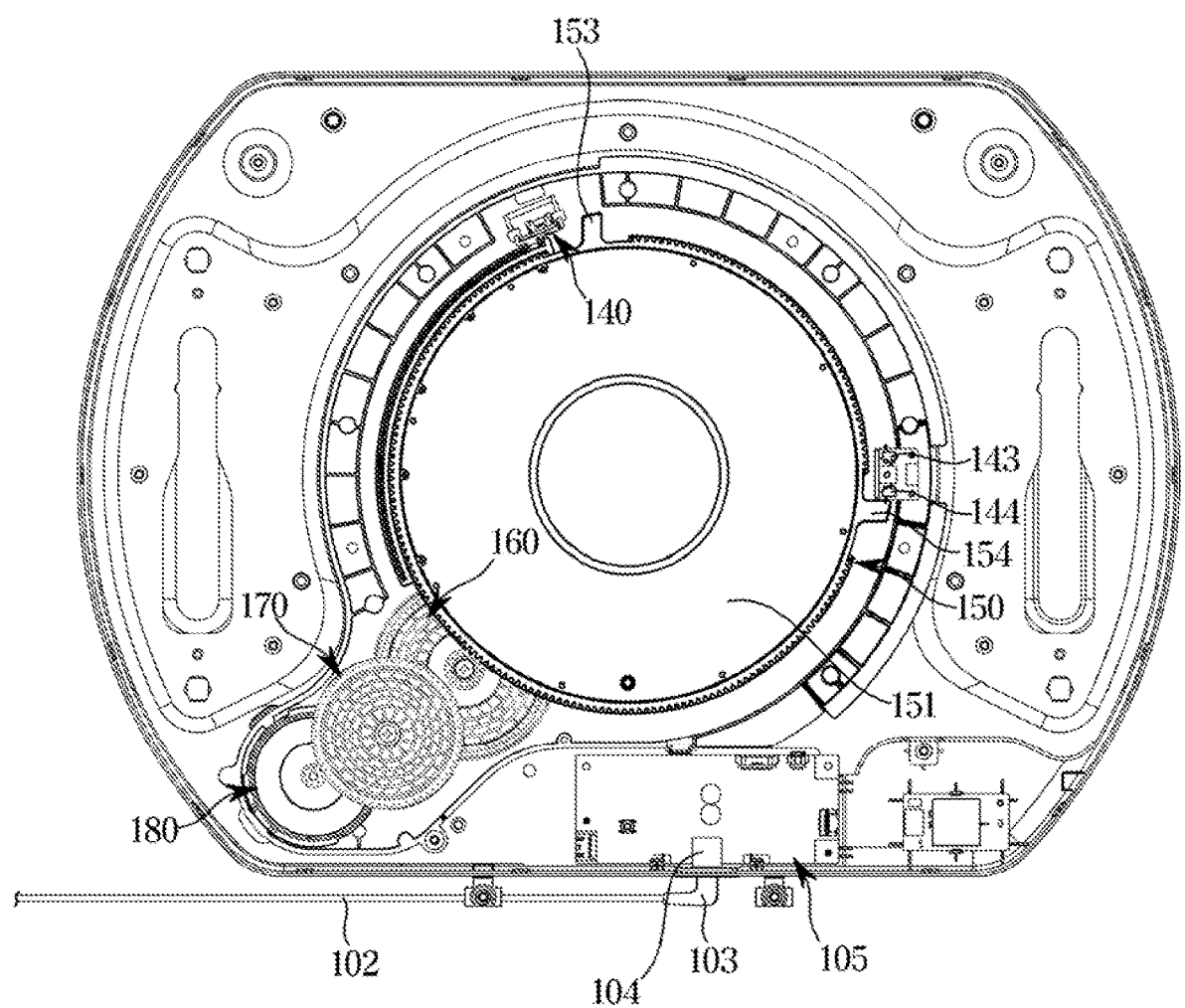
FIG. 15 is a view illustrating the inside of a rear surface of a rotator when a display module is vertically disposed in a display apparatus according to an embodiment.

FIG. 14 is a view illustrating the inside of a rear surface of the rotator 100 when a display module is horizontally disposed in the display apparatus according to an embodiment. FIG. 15 is a view illustrating the inside of a rear surface of the rotator when a display module is vertically disposed in the display apparatus according to an embodiment.

Referring to FIGS. 14 and 15, the rotator 100 according to an embodiment may include the detecting sensor 140 provided to detect a rotation amount of the first gear 150, the first switch 143 and the second switch 144 provided to detect a position of the first gear 150.

Referring to FIG. 14, when the display module 10 is disposed in the horizontal mode, the first push protrusion 153 of the first gear 150 may be provided to push the first switch 143. When the first push protrusion 153 pushes the first switch 143, the operation of the driving motor 180 may be stopped.

Referring to FIG. 15, when the display module 10 is disposed in the vertical mode, the second push protrusion 154 of the first gear 150 may be provided to push the second switch 144. When the second push protrusion 154 pushes the second switch 144, the operation of the driving motor 180 may be stopped.

As described above, when the first push protrusion 153 pushes the first switch 143, the driving motor 180 may stop the operation, and the display module 10 may be disposed in the horizontal mode. Similarly, when the second push protrusion 154 pushes the second switch 144, the driving motor 180 may stop the operation, and the display module 10 may be disposed in the vertical mode.

Figure 16:
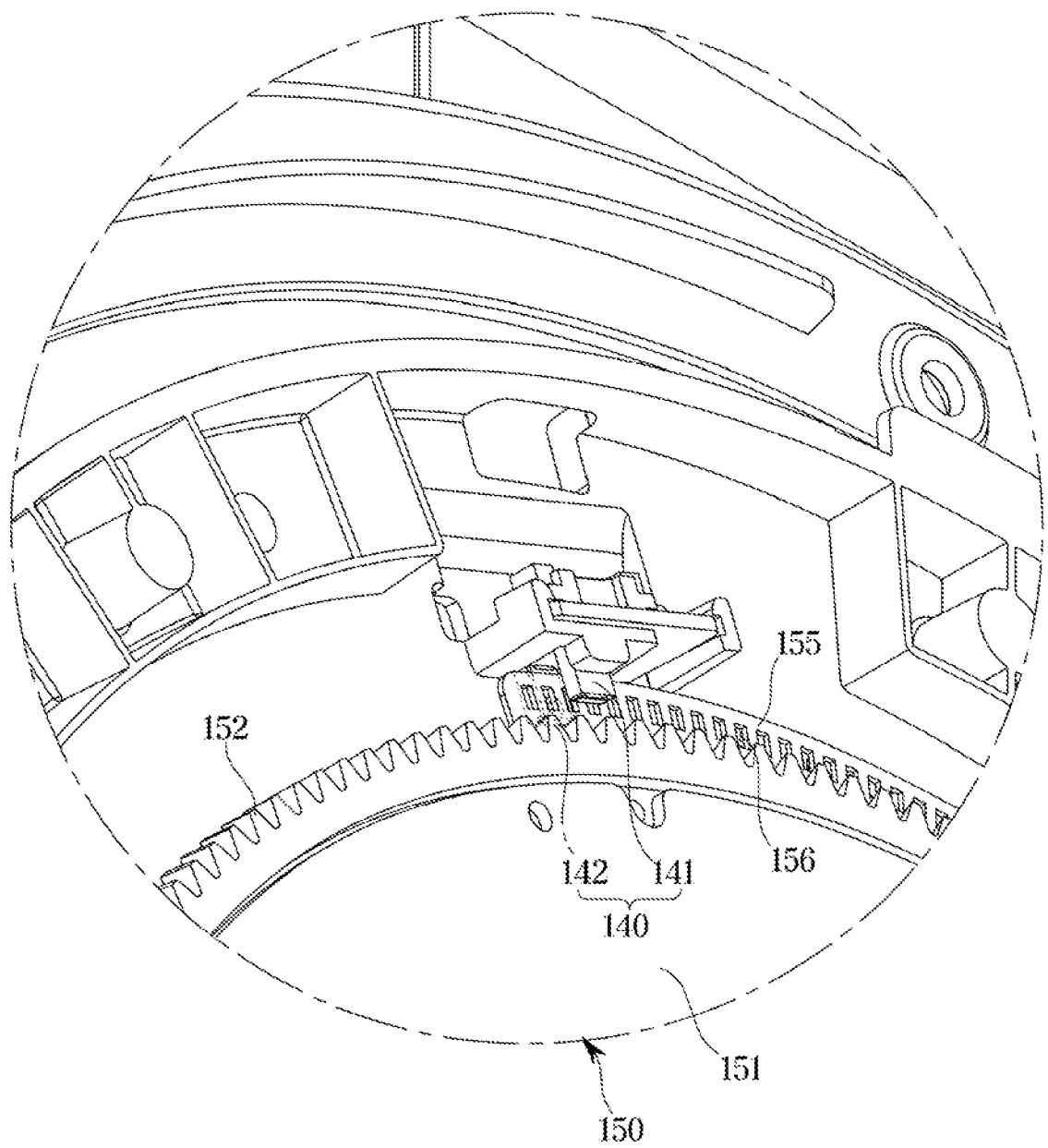
FIG. 16 is an enlarged view of a detecting sensor in a display apparatus according to an embodiment.

FIG. 16 is an enlarged view of the detecting sensor 140 in the display apparatus according to an embodiment.

Referring to FIG. 16, the detecting sensor 140 may be provided in the fixing holder 130. The detecting sensor 140 may be provided to detect the amount of rotation of the first gear 150.

The detecting sensor 140 may include a light transmitter 141 provided to emit light and a light receiver 142 provided to receive the light irradiated from the light transmitter 141. Unlike the drawings, positions of the light transmitter 141 and the light receiver 142 may be interchanged.

The disk 155 may be provided in the first gear 150. The disk 155 may include the plurality of slits 156 disposed to be spaced apart from each other. When the disk 155 rotates as the first gear 150 rotates, the light irradiated from the light transmitter 141 is intermittently received by the light receiver 142. The detecting sensor 140 may detect the amount of rotation of the first gear 150 based on whether the light receiver 142 receives the light.

By utilizing the detecting sensor 140, the first switch 143, and the second switch 144, the rotator 100 may stably detect the position of the display module 10 and prevent a malfunction of the driving motor 180.

According to one aspect of the present disclosure, it is possible to provide a rotator having a slim thickness and a display apparatus including the same.

According to one aspect of the present disclosure, it is possible to provide a rotator configured to prevent a display module from rotating in one direction due to a separation between a center of rotation and a center of gravity of a display module, and a display apparatus including the same In the above, specific embodiments have been shown and described. However, the present disclosure is not limited only to the above-described embodiments, and those of ordinary skill in the art to which the present disclosure pertains may make various changes without departing from the spirit of the present disclosure described in the claims below.

What is claimed is:

1. A display apparatus comprising:
a display module; and
a rotator coupled to the display module and provided to rotate the display module between a first mode in which the display module is vertically disposed and a second mode in which the display module is horizontally disposed,
wherein the rotator comprises:
a driving motor configured to provide a driving force;
a first gear configured to rotate around a first rotating axis parallel to a driving axis of the driving motor by the driving force from the driving motor; and
a second gear configured to mesh with the first gear and rotate around a second rotating axis parallel to the driving axis and the first rotating axis,
wherein the first gear comprises a first gear part, a first body, and the second gear comprises a second gear part, a second body, and a third body,
wherein the first gear part and the second gear part are formed to increase a rotational resistance between the first gear and the second gear when the display module rotates in a first direction in the first mode,
wherein the first gear part is formed along a circumferential surface of the first body,
wherein the second gear part is provided to mesh with the first gear part and formed along a circumferential surface of the second body,
wherein the third body is provided to rotate around the second rotating axis together with the second body and has a diameter greater than an external diameter of the second gear part, and
wherein the third gear part is formed along a circumferential surface of the third body.

2. The display apparatus of claim 1, further comprising a bracket mounted on a rear surface of the display module,
wherein the rotator is coupled to the display module and mounted on the bracket.

3. The display apparatus of claim 1, wherein the display module is provided to rotate around the first rotating axis.

4. The display apparatus of claim 1, wherein a first screw thread of the first gear part and a second screw thread of the second gear part are formed to generate a thrust in a direction in which the first body moves toward the third body when the display module rotates in the first direction.

5. The display apparatus of claim 1, wherein the rotator further comprises:
a third gear configured to mesh with the second gear and rotate around a third rotating axis parallel to the first rotating axis and the second rotating axis; and
a driving gear coupled to the driving axis and configured to rotate together with the driving axis.

6. The display apparatus of claim 5, wherein the third gear comprises:
a fourth body;
a fourth gear part provided to mesh with the third gear part and formed along a circumferential surface of the fourth body;
a fifth body provided to rotate around the third rotating axis together with the fourth body and having a diameter greater than an external diameter of the fourth gear part; and a fifth gear part formed along a circumferential surface of the fifth body,
wherein the driving gear is provided to mesh with the fifth gear part.

7. The display apparatus of claim 6, wherein the first to fifth gear parts and the driving gear are helical gears.

8. The display apparatus of claim 1, wherein a thickness of the driving motor is less than twice a thickness of the second gear.

9. The display apparatus of claim 1, wherein the rotator further comprises:
a rotating holder coupled to the first gear to rotate around the first rotating axis together with the first gear; and
a fixing holder disposed between the first gear and the rotating holder, and configured to rotatably support the first gear and the rotation holder.

10. The display apparatus of claim 9, wherein the rotator further comprises a plurality of balls provided to assist in relative rotation of the rotating holder with respect to the fixing holder.

11. The display apparatus of claim 10, wherein the rotating holder comprises a plurality of ball-accommodating grooves provided to accommodate the plurality of balls, respectively, and
wherein the fixing holder comprises a ball-guide configured to form a path along which the plurality of balls move.

12. The display apparatus of claim 1, wherein the rotator further comprises:
a disk coupled to the first gear to rotate together with the first gear and comprising a plurality of slits disposed at regular intervals; and
a detecting sensor comprising a light transmitter disposed at one side of the disk, and a light receiver disposed at the other side of the disk.

13. The display apparatus of claim 1, wherein the first gear comprises a first push protrusion protruding outward in a radial direction of the first gear, and a second push protrusion disposed to be spaced apart from the first push protrusion, and
wherein the rotator further comprises:
a first switch provided to be pushed by the first push protrusion when the display module is positioned in the first mode; and
a second switch provided to be pushed by the second push protrusion when the display module is positioned in the second mode.

14. A display apparatus comprising:
a display module; and
a rotator coupled to the display module and provided to rotate the display module between a first mode and a second mode,
wherein the rotator comprises:
a driving motor configured to provide a driving force;
a first gear configured to rotate around a first rotating axis parallel to a driving axis of the driving motor; and
a second gear configured to mesh with the first gear and rotate around a second rotating axis parallel to the driving axis and the first rotating axis, and
wherein a first screw thread of the first gear and a second screw thread of the second gear are formed to increase a rotational resistance between the first gear and the second gear when the display module rotates in a direction in the first mode, and
wherein the first screw thread of the first gear and the second screw thread of the second gear are formed to generate a thrust of the first gear and the second gear such that the thrust increases the rotational resistance between the first gear and the second gear when the display module rotates in the direction in the first mode.

15. The display apparatus of claim 14, wherein in the first mode, the display module is vertically disposed, and a center of rotation of the display module and a center of gravity of the display module are positioned on a straight line extending in a gravity direction of the display module, and wherein in the second mode which the display module is horizontally disposed, and the center of rotation of the display module and the center of gravity of the display module are not positioned on the straight line extending in the gravity direction of the display module.

16. The display apparatus of claim 14, wherein the first screw thread of the first gear and the second screw thread of the second gear are formed to generate a first thrust to move a part of the first gear toward a part of the second gear.

17. The display apparatus of claim 16, wherein the first screw thread of the first gear and the second screw thread of the second gear are formed to generate a second thrust to move the part of the second gear toward the part of the first gear.

* * * * *